Patented July 28, 1942

2,290,854

UNITED STATES PATENT OFFICE 2,290,854

SIMULATED FAT AND METHOD OF PREPARING THE SAME

Frank H. Hoy, Milwaukee, Wis., assignor to Hoy Equipment Co., Milwaukee, Wis., a corporation of Wisconsin No Drawing. Application May 14, 1941, Serial No. 393,378

6 Claims. (Cl. 99—169)

This invention relates to meltable fat compositions suitable for the coating of loaf meat or similar comestible by dipping and the like and it resides specifically in an improvement in such compositions as have heretofore been proposed and used, which results in a texture or consistency more closely resembling that of unrendered natural animal fat.

One object of this invention is to provide a meltable fat composition which congeals at ordinary atmospheric temperatures to a consistency more nearly resembling that of ordinary unrendered animal fat, the same being free to a large extent of the rubberyness of gelatine-sustained compositions.

Another object of this invention is to provide a meltable fat composition which will be self-sustaining when congealed and which at the same time may contain a major proportion of a soft fat, such as hog fat.

Another object of this invention is to provide a composition which may be simply and economically prepared by a novel method in a manner which enhances the degree of utilization of the animal.

The above and other advantages and purposes of this invention will become apparent from the description which follows in which there is set forth, by way of illustration and not of limitation, specific instances of the best mode now known to me of giving effect to my inventive concept.

Heretofore loaf meat, loaf sausage, and the like, have frequently been prepared in loaves or slabs with an outer coating of fat which substantially enhances the appetizing attractiveness and appearance of the loaf and adds a balancing element to the commodity from a dietary standpoint. Such coating is usually applied at the present time by the method known as "layering." By this method, carefully cut strips of back-fat are placed by hand against the inner walls of the mold in which the loaf is to be prepared. The soft, hot meat composition is then placed in the mold without disturbing the fat strips and the mold placed in a press while cooking or other finishing steps are performed. This practice is a tedious and expensive one and the back-fat required becomes lost for the higher purposes for which it might otherwise be employed.

To avoid the above disadvantages it has been proposed to incorporate with a strong gelatine solution molten lard in the ratio of about three pounds of lard to four pounds of gelatine solution. This is thoroughly mixed to emulsify the molten fat and into this mixture, while molten, finished loaves of meat are dipped. The molten material forms a coating which congeals upon cooling, the gelatine solution serving to form a sustaining framework for the otherwise soft lard. The resulting product is very rubbery and has been described as having the consistency of the white of a hard-boiled egg. The rubbery, elastic nature of the coating is unnatural and is objectionable and unattractive to many consumers and in spite of the advantages of simplified manufacture such method has heretofore been little in favor.

From experience it has been found that the proportion of gelatine may not be reduced substantially in an effort to avoid rubberyness in texture without impairing the self-sustaining properties of the coating to a point where the coating is no longer satisfactory. I have discovered, however, that if a binding material having a semi-fibrous character is employed in place of gelatine that a very substantially smaller proportion of such binder material is adequate to give the fat coating a satisfactory self-sustaining character and at the same time, due to the increased fat content, the new coating material has properties with respect to texture much more closely resembling those of natural fat.

As a specific instance for carrying into effect my invention, I place within a heated vessel scraps of hog skin, from which all bristles and foreign matter has been removed, and to these I add sufficient water to cover the hog skin scraps. The vessel is kept at or near the boiling point for from one to two hours, more or less, until the skins become somewhat softened and plumped. The scraps are then separated from the cooking fluid and passed through a grinder or equivalent mechanical means to reduce the same to a rather fine particle size. To the ground skins there is then added hog fat trimmings which have been cooked in boiling water for about twenty minutes so as to soften the same but without separating the fat from its natural tissue framework. The proportion of such fat added to the vessel is preferably in the neighborhood of three pounds of such fat to two pounds of the cooked and ground skins. These proportions may be varied within limits without departing from this invention. I prefer, however, to use a goodly quantity of fat in order that the composition shall have a true fat-like character. However, it is possible to employ as little as equal quantities of fat and ground skins, or the fat content may be increased to the point where the proportion of ground skins is less than ten per cent of the completed composition. It will be understood that as the quantity of ground skins is reduced a softer and less self-sustaining composition will result. I prefer to add the fat to the ground skins in a mixing and chopping device, such as a silent cutter. The implement used for this purpose should be cold at the outset so that the desired mixing and binding action will take place. When the fat has been chopped very fine and a thorough incorporation of the ingredients has taken place, the mixture is gently heated, as with a hot water jacket or the like. While the heating is going on the mixture is stirred and the stirring and heating are continued until the mixture is smooth and quite fluid.

The composition is then ready for use as intended and loaves of meat may be dipped into the hot composition and then removed to a cool place, such as a refrigerated cooler, whereupon the coating will become set. The temperature of the composition at the time of dipping may be regulated as desired to produce coatings of different thicknesses. If desired, coating of greater thickness may be built up by successive dipping.

For some products the fluid composition may be poured into an empty mold and then poured out, leaving a coating on the mold, after which the empty space in the mold may be filled with a meat composition and processed in such manner as desired. It will be understood that the temperatures employed in such subsequent processing will be limited by the temperature at which the coating material will become so fluid as to be entirely absorbed into the principal contents of the mold.

By the process steps outlined above, the tissue fibre of the skins although substantially altered by the cooking is nevertheless preserved to a considerable degree. Likewise, in utilizing the unrendered hot fat, part of the natural fat tissue framework is retained in spite of the chopping to which the material is subjected. I believe it is due to this that I am able to employ a much smaller proportion of binder material and at the same time I am able to procure a composition having satisfactory self-sustaining properties. It is to be understood that this explanation is given by way of theory and that other agencies may be active to produce the novel effect which I have obtained. I therefore do not insist upon the accuracy of the explanation which I have given, although I believe it aids in an understanding of the practical steps which are required to place my invention into effect.

In the cooking of the skins the quantity of water employed and remaining in the cooked skins may be permitted to vary within limits departing from my invention, since this is a matter which is controlled by the character of the skins. By the term "skins" I mean to include herein and in the language of the claims skin scraps, skin trimmings, and such animal parts as snouts, feet, and the like. The cooked fat employed in my composition is ordinarily separated from the cooking fluid before being added to the composition, but a moderate amount of such fluid, or water from other sources, may be incorporated, if desired.

In the specific instance described above, hog fat and hog skins are mentioned as specific ingredients. However, animal fat in general, including beef and mutton tallow, poultry fat, and the like, may be used with like results and such fats may be modified, replaced, or supplemented by additions of fats and oils of vegetable origin. Likewise, the binder ingredient may consist of cooked skins of animals other than hogs and may be modified, replaced, or supplemented with cooked cereal binders or other substances of vegetable origin, the same being prepared from the whole grain or from the plant parts as a whole from which the binder is obtained so that the natural plant fibre remains as a part of the finished binder.

Other incidental ingredients may be incorporated in the coating material of this invention to modify either its flavor or appearance. Salt or other seasoning or spices may be employed. It is also possible to admix with the coating composition, after it is completed, small floating particles of meat or other edible substances to give a speckled appearance.

What I claim as my invention is:

1. A meltable meat coating composition which consists of an intimate mixture of from fifty to ninety per cent by weight of fat and from fifty to ten per cent by weight of a binder composed of finely subdivided partially solid cooked skin.

2. A meltable meat coating composition which consists of an intimate mixture of from fifty to ninety per cent by weight of finely subdivided cooked fat containing original fat tissue fibre and from fifty to ten per cent by weight of a binder composed of finely subdivided partially solid cooked skin.

3. A meltable meat coating composition which consists of an intimate mixture of from fifty to ninety per cent by weight of finely subdivided cooked hog fat containing original fat tissue fibre and from fifty to ten per cent by weight of a binder composed of finely subdivided partially solid cooked hog skin.

4. A meltable meat coating composition which consists of an intimate mixture of from fifty to ninety per cent by weight of fat and from fifty to ten per cent by weight of a binder containing finely subdivided animal skin plumped by cooking without complete destruction of tissue structure.

5. The method of preparing a congealable molten meat coating composition which comprises plumping animal skin by cooking the same in water for from one to two hours at or near the boiling point, separating said skin from the cooking liquor and grinding said separated skins, then adding to said ground skins in a cool vessel cooked animal fat in the proportion of from one to nine parts by weight of fat to one part by weight of ground skins, and then thoroughly subdividing and mixing said skin and fat while gently heating the same until a smooth fluid mixture is obtained.

6. An article of manufacture, comprising a solid body of a composition containing meat, said body having a congealed layer composed of an intimate admixture of fat and finely subdivided partially solid cooked animal skin adhering to the exterior surface thereof.

FRANK H. HOY.